United States Patent [19]

Maeda et al.

[11] Patent Number: 4,930,014

[45] Date of Patent: May 29, 1990

[54] METHOD AND APPARATUS FOR PROCESSING A STILL PICTURE SIGNAL

[75] Inventors: Satoru Maeda, Kanagawa; Yasushi Noguchi, Saitama; Kazunori Yasuda; Shyunsuke Takano, both of Kanagawa, all of Japan

[73] Assignee: Sony Corporation, Tokyo, Japan

[21] Appl. No.: 352,487

[22] Filed: May 16, 1989

[30] Foreign Application Priority Data

May 17, 1988 [JP] Japan .................. 63-120236

[51] Int. Cl.$^5$ .......................................... H04N 5/272
[52] U.S. Cl. ................................. 358/209; 358/180; 358/909; 358/183
[58] Field of Search ............... 358/180, 213.3, 213.26, 358/209, 225, 183, 909

[56] References Cited

U.S. PATENT DOCUMENTS

| | | | |
|---|---|---|---|
| 3,935,381 | 1/1976 | Petrocelli et al. | 358/180 |
| 4,002,824 | 1/1977 | Petrocelli et al. | 358/213.3 |
| 4,079,413 | 3/1978 | Yamashita | 358/180 |
| 4,426,664 | 1/1984 | Nagumo et al. | 358/213.26 |
| 4,467,355 | 8/1984 | Matsuda . | |
| 4,589,029 | 5/1986 | Torimaru et al. | 358/180 |
| 4,610,026 | 9/1986 | Tabata et al. | 358/180 |
| 4,734,772 | 3/1988 | Akiyama | 358/180 |

FOREIGN PATENT DOCUMENTS 2174266 10/1986 United Kingdom .

Primary Examiner—Stephen Brinich
Attorney, Agent, or Firm—Philip M. Shaw, Jr.

[57] ABSTRACT

A still picture signal editing or processing apparatus having a still picture signal source for generating a still picture signal, an analog-to-digital converter for converting the still picture signal into a digitized still picture signal, first and second main field memories, an auxiliary field memory, a signal processor for processing a still picture signal, a display for displaying a still picture, a selector for supplying a signal selectively read out from the first and second main field memories to the display, and a memory controller for controlling read and write operations of the first and second main field memories and auxiliary field memory, thereby a digitized still picture signal from the analog-to-digital converter is supplied to the first main field memory, the digitized still picture signal is read out from the first main field memory, compressed by 1/n in data amount and is separated into first and second compressed signals by the signal processor, the first and second compressed signals are supplied to the second main field memory and auxiliary field memory, respectively and written in portions of the second main field memory and the auxiliary field memory, respectively, the second compressed signal is read out from the auxiliary field memory and supplied to the first main field memory, and the first and second compressed signals are read out from the second and first main field memories, are combined and supplied to the display.

5 Claims, 4 Drawing Sheets

FR-M1

FL-M1

FR-M2

FL-M2

FR-M1

FL-M1

FR-M2

FL-M2

METHOD AND APPARATUS FOR PROCESSING A STILL PICTURE SIGNAL

BACKGROUND OF THE INVENTION

1. Field of the Invention

The present invention relates generally to still picture signal editing or processing method and apparatus thereof and, more particulary, to a still picture signal processing method and an apparatus thereof for use with a still picture signal communcation user terminal apparatus.

2. Description of the Prior Art

A prior-art still picture signal editing or processing apparatus applied to a still picture signal communication user terminal apparatus will hereinafter be described with reference to FIGS. 1 and 2.

An example of a prior-art still picture signal editing or processing apparatus that edits or processes a still picture signal by using two frame memories FR-M1 and FR-M2 will be described first with reference to FIG. 1.

A first input still picture signal (for example, a still picture signal representing "A") is written in one frame memory FR-M1, and the first still picture signal stored in the frame memory FR-M1 is read out therefrom to provide a first display signal as shown in FIG. 1-I. Then, an extraced still picture signal formed of every other picture elements in the horizontal and vertical directions of the first input still picture signal is read out and is written in a first memory area of ¼ frame of the other frame memory FR-M2. The written still picture signal is then read out to provide a second display signal as shown in FIG. 1-II.

A second input still picture signal (for example, a still picture signal representing "B") is written in one frame memory FR-M1, and the second still picture signal written in the frame memory FR-M1 is read out to provide a third display signal (FIG. 1-III). Then, an extracted still picture signal formed of every other picture elements in the horizontal and vertical directions of the second input still picture signal is read out and is written in a second memory area of ¼ frame of the other frame memory FR-M2. Also, the first and second extracted still picture signals are respectively read out to provide a fourth display signal.

The above-mentioned signal processings are repeatedly carried out hereinafter, whereby an extracted still picture signal of a third still picture signal (for example, a still picture signal representing "C", though not shown) and an extracted still picture signal of a fourth extracted still picture signal (for example, a still picture signal representing "D", though not shown) are sequentially written in third and fourth frame memory areas of ¼ frames of the other frame memory FR-M2, and then the first to fourth extracted still picture signals are read out and are supplied to a monitor receiver as a final display signal.

An example of a prior-art still picture signal editing or processing apparatus which edits or processes a still picture signal by using two field memories FL-M1 and FL-M2 will be described.

A first input still picture signal (for example, a still picture signal representing "A") is written in one first field memory FL-M1, and the still picture signal written in the field memory FL-M1 is read out to provide a first display signal (FIG. 2-I). Then, an extracted still picture signal formed of every other picture elements in the horizontal and vertical directions of the first input still picture signal is read out and is written in a first memory area of ¼ frame of the other second field memory FL-M2. Also, the still picture signal thus written in the second field memroy FL-M2 is read out to provide a second display signal as shown in FIG. 2-II.

A second input still picture signal (for example, a still picture signal representing "B") is written in one field memory FL-M1, and the second still picture signal written in the first field memory FL-M1 is read out to provide a third display signal (FIG. 2-III). Then, an extracted still picture signal formed of every other picture elements in the horizontal and vertical directions of the second input still picture signal is read out and is written in a second memory area of ¼ field of the second field memory FL-M2. Also, the extracted still picture signals of the first and second still picture signals are read out to provide a fourth display signal.

The above-mentioned signal processings are repeatedly carried out hereinunder, whereby an extracted signal of a third still picture signal (for example, a still picture signal representing "C", though not shown) and a fourth extracted still picture signal (for example, a still picture signal representing "D") are sequentially written in third and fourth ¼ field memory areas of ¼ field of the second field memory FL-M2, respectively. Then, the first to fourth extracted still picture signals are read out and are supplied to the monitor receiver as the final display signal.

The prior-art still picture signal processing apparatus explained with reference to FIG. 1 employs the two frame memories FR-M1 and FR-M2 so that the display signal, provided by reading the extracted still picture signals shown in FIGS. 1-I and 1-IV from the frame memory FR-M2, is high in resolution. This prior-art still picture signal processing apparatus, however, needs two frame memories. Hence, this apparatus becomes very expensive.

The prior-art still picture signal processing apparatus explained with reference to FIG. 2 requires two field memories FL-M1 and FL-M2, namely, one frame memory so that it becomes inexpensive. In this prior-art apparatus, however, the extracted still picture signals of FIGS. 2-II and 2-IV stored in the field memory FL-M2 are read out, which provides the display signal of low resolution.

OBJECTS AND SUMMARY OF THE INVENTION

It is an object of the present invention to provide an improved still picture signal editing or processing method and an apparatus thereof which can remove the defects encountered with the prior art.

It is another object of the present invention to provide a still picture signal processing method and an apparatus thereof which can provide a display signal having high resolution by reading a plurality of still picture signals stored in a memory.

It is still another object of the present invention to provide a still picture signal processing method and an apparatus thereof which can be manufactured at low cost.

In accordance with an aspect of the present invention, there is provided a still picture signal processing apparatus for processing a still picture signal and for displaying a still picture according to a still picture signal comprising:

(a) still picture signal source means for generating a still picture signal;

(b) analog-to-digital converting means for converting said still picture signal into a digitized still picture signal;

(c) first and second main field memory means;

(d) auxiliary field memory means;

(e) signal processing means for processing a still picture signal;

(f) display means for displaying a still picture;

(g) means for supplying a signal selectively read out from said first and second main field memory means to said display means; and (h) memory control means for controlling read and write operations of said first and second main field memory means and auxiliary field memory means, thereby a digitized still picture signal from said analog-to-digital converting means is supplied to said first main field memory means, said digitized still picture signal is read out from said first main field memory means, and is compressed by 1/n in data amount and is separated into first and second compressed signals by said signal processing means, said first and second compressed signals are supplied to said second main field memory means and auxiliary field memory means, respectively and written in portions of said second main field memory means and auxiliary field memory means, respectively, said second compressed signal is read out from said auxiliary field memory means and is supplied to said first main field memory means, and said first and second compressed signals are read out from said second and first main field memory means, combined and supplied to said display means.

In accordance with another aspect of the present invention, there is provided a method of processing a still picture signal by a still picture signal processing apparatus having first and second main field memory means, auxiliary field memory means and display means, said method comprising the steps of:

(1) converting a first still picture signal to a digitized first still picture signal;

(2) supplying said digitized first still picture signal to said first main field memory means;

(3) reading out said stored digitized first still picture signal from said first main field memory means;

(4) compressing said read out digitized first still picture signal by 1/n in data amount and generating first and second compressed signals;

(5) supplying said first and second compressed signals to said second main field memory means and said auxiliary field memory means, respectively;

(6) reading out said second compressed signal from said auxiliary field memory means;

(7) supplying said read out second compressed signal to said first main field memory means;

(8) reading out said first and second compressed signals from said second and first main field memory means;

(9) combining said read out first and second compressed signals and supplying said combined signal to said display means; and

(10) repeating said steps (1) to (9) for second to nth still picture signals, respectively.

The above, and other objects, features and advantages of the present invention will become apparent from the following detailed description of a preferred embodiment of the invention when read in conjunction with the accompanying drawings.

DETAILED DESCRIPTION OF PREFERRED EMBODIMENT

An embodiment of a still picture signal editing or processing apparatus according to the present invention will now be described with reference to the drawings. In this embodiment, a still picture signal editing or processing apparatus is applied to a still picture signal communication user terminal apparatus.

Figure 1:
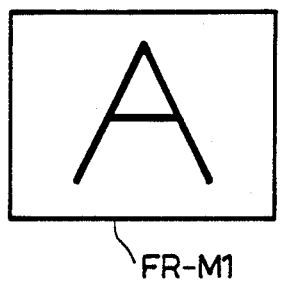
FIGS. 1-I to 1-IV and FIGS. 2-I to 2-IV are schematic diagrams used to explain examples of prior-art still picture signal processing apparatus, respectively.
Figures 1, 2:
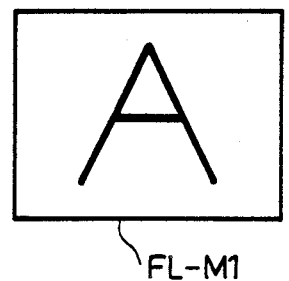
Figures 1, 2:
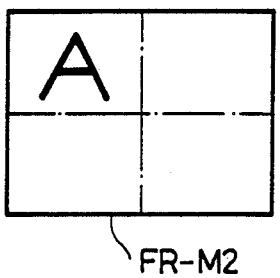
Figure 2:
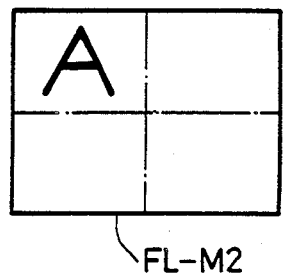
Figures 1, 2, 3:
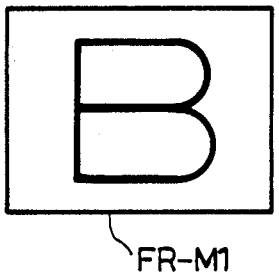
FIG. 3 is a block diagram showing an embodiment of a still picture signal editing or processing apparatus according to the present invention.
Figures 2, 3:
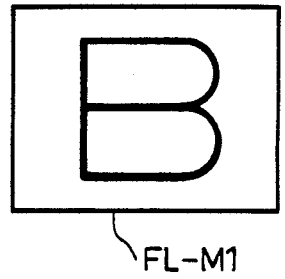

Referring to the drawings in detail and initially to FIG. 3, it will be seen that a computer (or microcomputer) 1 is provided which comprises a central processing unit (CPU) 2, read only memory (ROM) 3 and a random access memory (RAM) 4. The central processing unit 2 is connected with a bus 5 and the bus 5 is formed of data bus, address bus, control bus and the like. The read only memory 3 and the random access memory 4 are connected to the bus 5. The computer 1 controls the respective portions of the still picture communication user terminal apparatus.

There is provided a transmission line 20 through which there might be effected either wireless or wired transmission line system. In the case of the wired transmission line system, there might be an integrated services digital network (ISDN), a high speed digital network line, an analog telephone network line, a digital data exchange (DDX) network (in which there are two kinds or DDXC and DDXP), special network line and so on.

A communication and interface and communication processing circuit 19, which corresponds to the protocol of a still image signal of the transmission line 20 and its transmission speed, is connected between the transmission line 20 and the bus 5. The communication processing circuit 19 performs the encoding, the modulation and the like for transmitting data and performs the decoding, the demodulation and the like for receiving the data.

There are provided first and second main field memories 6 and 7 and an auxiliary field memory (or work memory) 8. The field memories 6 and 7 constitute a frame memory. Let it be assumed that such a frame memory which has a storage capacity of 1024 pixels (picture elements) in the horizontal direction and 512 pixels in the vertical direction is employed. If its part used as the field memories 6 and 7 is assigned to, for example, 600×400 pixels, then, the remaining pixels considerably exceed 600× 400 pixels so that instead of preparing another memory as the field memory 8, one frame memory is adequate to form the field memories 6, 7 and 8.

A write/read control circuit 9 is connected to the bus 5 so that it is controlled by the computer 1. Also, the write/read control circuit 9 supplies its respective control signals to the write enable input terminals of the field memories 6 and 7.

An address signal generating circuit 10 is connected to the bus 5 and is thereby controlled by the computer 1. The address signal generating circuit 10 is supplied with vertical and horizontal synchronizing signals and a clock signal from a display timing circuit 11 and then supplies horizontal and vertical address signals to the respective address signal input terminals of the field memories 6 and 7.

A video signal (color video signal or black and white video signal) from a video camera, a video tape recorder (VTR) or the like is applied to an input terminal 12. The video signal applied to the input terminal 12 is supplied to an analog-to-digital (A/D) converting circuit 13, in which it is converted to a digital video signal. The digital video signal is supplied to the field memory 6 (or field memory 7 may be possible), wherein its field video signal is written therein.

The input and output terminals of the memories 6 and 7 are respectively connected to the bus 5, and the output terminals of the memories 6 and 7 are connected to a selector 15 and to a mixing circuit 14. The selector 15 is connected to the bus 5 so that it is controlled by the computer 1 so as to selectively produce the outputs of the memories 6, 7 and of the mixing circuit 14. The output from the selector 15 is supplied to the bus 5, and is also supplied through a digital-to-analog (D/A) converter 16 to a monitor receiver 17 and to a video printer 18.

Input and output terminals of the auxiliary field memory 8 are connected to the bus 5.

The operation of this embodiment shown in FIG. 3 will be described with reference to FIGS. 4-I to 4-III through FIGS. 9-I to 9-III.

Figures 1, 2, 3, 4:
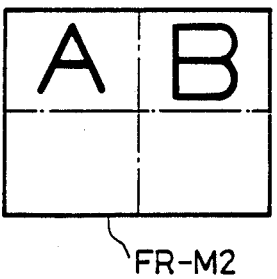
FIGS. 4-I to 4-III through FIGS. 9-I to 9-III are schematic diagrams used to explain the operation of the embodiment of the present invention, respectively.
Figures 2, 3, 4:
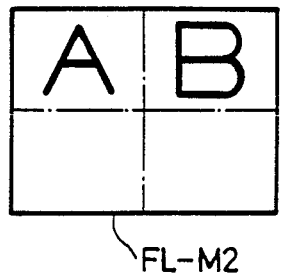
Figure 3:
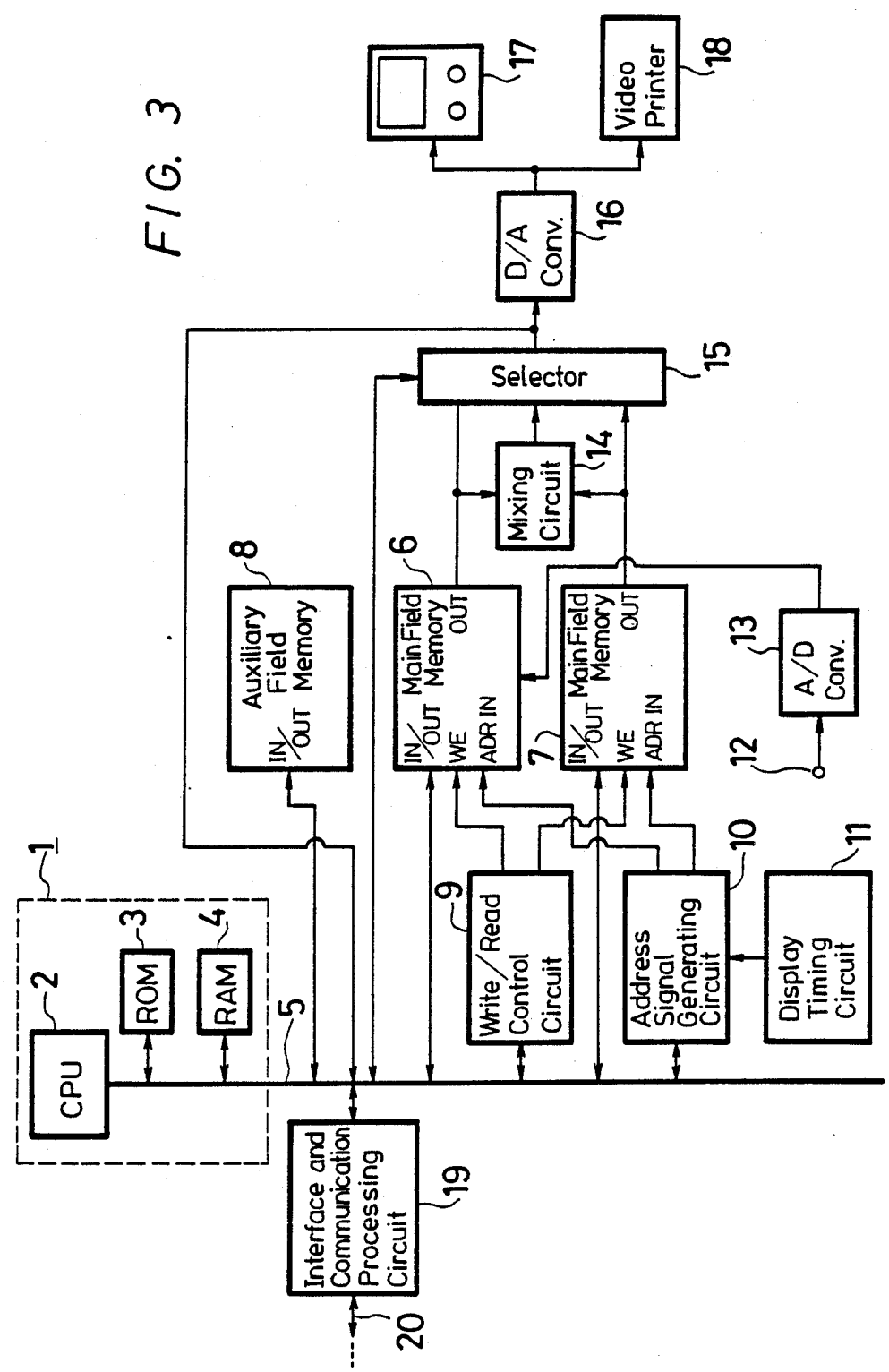
Figures 1, 5:
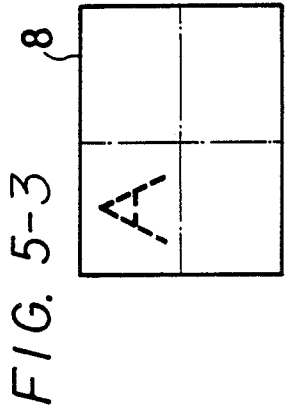
Figures 2, 5:
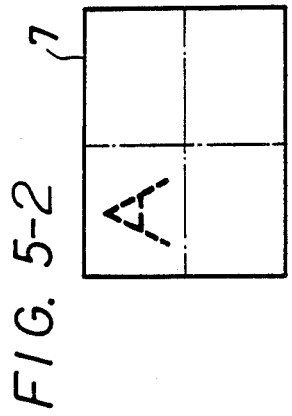
Figures 3, 5:
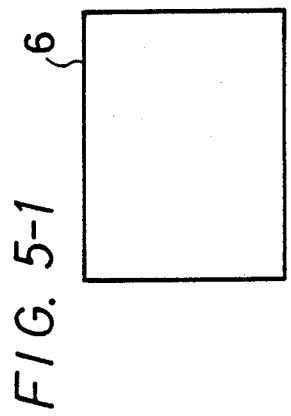
Figures 1, 4:
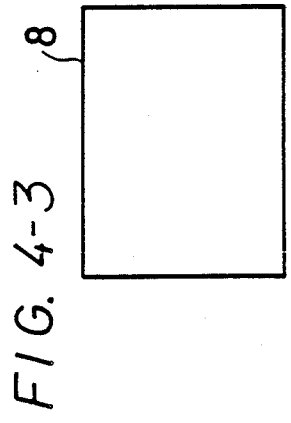
Figures 2, 4:
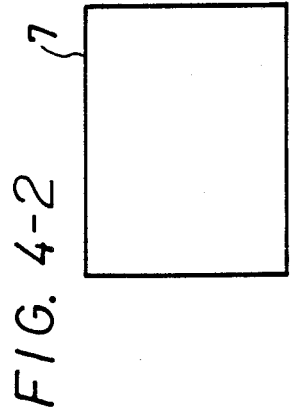
Figures 3, 4:
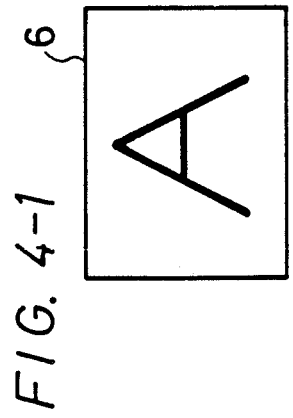

The input digital still picture signal (digital field video signal representing a character "A") from the A/D converter 13 is written in the memory 6 as shown in FIG. 4-I. Also, the data stored in the memory 6 are read out and are selected by the selector 15. The data selected is converted to the analog still picture signal by the D/A converter 16 and is then fed to the monitor receiver 17 on which display screen it displayed as a still picture. During this period of time, no still image data is stored in the memories 7 and 8 as shown in FIGS. 4-II and 4-III.

n (n is 1, 2, 3, . . . and can be freely selected) pixel signals, in this example, every other pixel signals in the horizontal and vertical directions of the input still picture signal are read out from the memory 6 to provide a first extracted still picture signal and its n pixel signals, in this embodiment, an intermediate pixel signal between adjacent ones of the every other pixel signals is read out. A second extracted still picture signal formed of pixel signals associated with the thus read intermediate pixel signals is written in $1/(n+1)^2$ field memory areas, namely, ¼ field memory areas of the memoirs 7 and 8 as shown in FIGS. 5-II and 5-III. Simultaneously, the data stored in the memory 7 are read out and are selected by the selector 15. The thus selected signal is converted to an analog still picture signal by the D/A converter 16, which is fed to the monitor receiver 17 as a second display signal and is thereby displayed on the screen of the monitor receiver 17. In that event, the data stored in the memory 6 are erased as shown in FIG. 5-I.

Figures 1, 6:
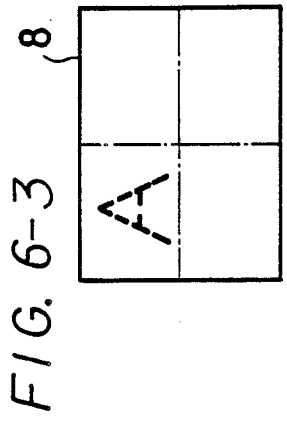
Figures 2, 6:
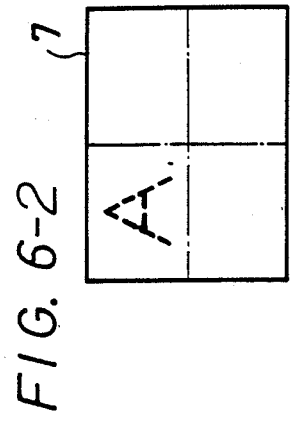
Figures 3, 6:
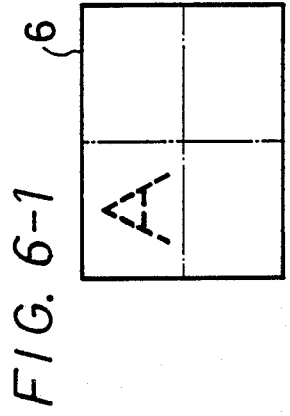

The second extracted still picture signal read out from the memory 8 is copied in the $1/(n+1)^2$ field area, in this example, ¼ field memory area of the memory 6 as shown in FIG. 6-I. Hence, the second and first extracted still picture signals are stored in the memories 6 and 7 as shown in FIGS. 6-I and 6-II, whereas the second still picture signal is stored in the memory 8 as shown in FIG. 6-III similarly to FIG. 5-III.

The first and second extracted still picture signals written in the memories 7 and 6 are mixed together by the mixing circuit 14. The mixed signal is selected by the selector 15 and is converted to the analog still picture signal by the D/A converter 16. The analog still picture signal from the D/A converter 16 is supplied to the monitor receiver 17 as a third display signal, and is thereby displayed on the monitor screen with high resolution.

Figures 1, 7:
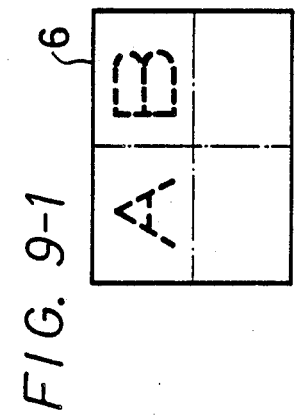
Figures 2, 7:
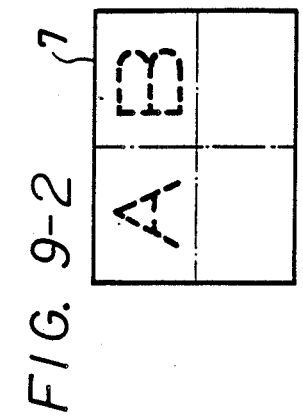
Figures 3, 7:
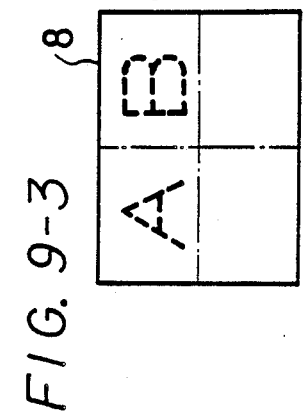

An input digital still picture signal (digital field video signal representing character "B") from the A/D converter 13 is written in the memory 6 as shown in FIG. 7-I, and the data stored in the memory 6 is read out. The thus read data is selected by the selector 15 and is converted to an analog still picture signal by the D/A converter 16. The analog still picture signal from the D/A converter 16 is supplied to the monitor receiver 17 and is thereby displayed on the screen of the monitor receiver 17. During this period, the first and second still picture signals representing the preceding character "A" are stored in the memories 7 and 8.

Figures 1, 8:
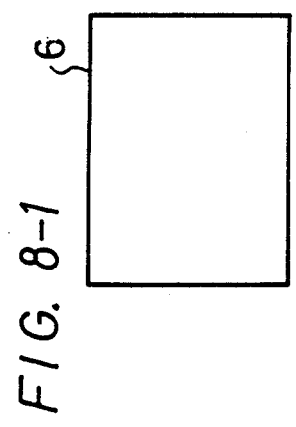
Figures 2, 8:
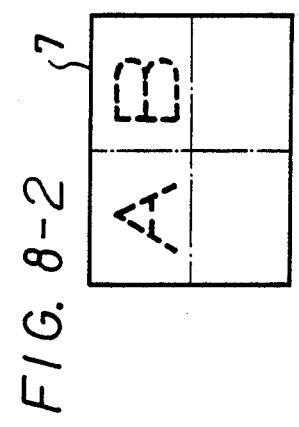
Figures 3, 8:
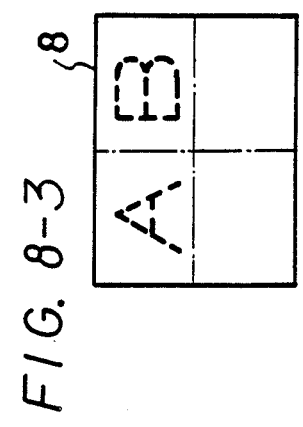

A picture element signal between a first extracted still picture signal, which resulting from reading every other pixel signals in the horizontal and vertical directions of the input still picture signal of the character "B", and its every other picture signal, is read out from the memory 6. A second extracted still picture signal formed of picture signals associated with the thus read intermediate picture element signals is copied in a ¼ field memory area adjacent in the horizontal direction to the ¼ field memory area of the character "A" in each of the first and second memories 6 and 7 as shown in FIGS. 8-II and 8-III. Further, the data stored in the memory 7 are read out and are selected by the selector 15. The selected data is converted to an analog still picture signal by the D/A converter 16, and is supplied to the monitor receiver 17 as the second display signal so as to be displayed on the screen of the monitor receiver 17. In that event, the data stored in the memory 6 are erased as shown in FIG. 8-I.

Figures 1, 9:
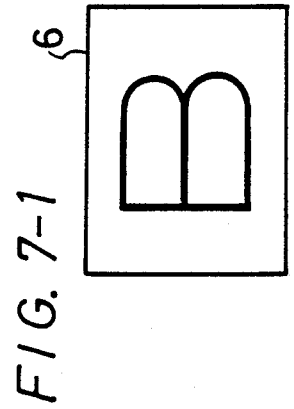
Figures 2, 9:
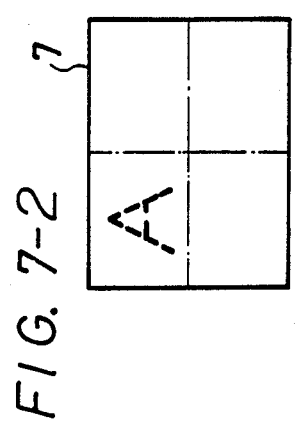
Figures 3, 9:
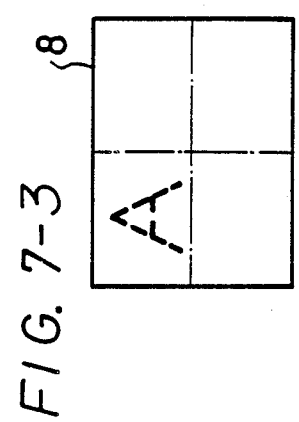

The second extracted still picture signals representing the characters "A" and "B" and read out from the memory 8 are copied in the respective ¼ field memory areas of the memory 6 as shown in FIG. 9-I. Thus, the first and second extracted still picture signals representing the characters "A" and "B" are respectively stored in the memories 6 and 7 as shown in FIGS. 9-I and 9-II, and the second extracted still picture signals are stored in the memory 8 as shown in FIG. 9-III similar to that shown in FIG. 8-III.

The first and second extracted still picture signals representing the characters "A" and "B" and stored in the memories 7 and 6 are mixed by the mixing circuit 14. The mixed signal is selected by the selector 15, and is then converted to an analog still picture signal by the D/A converter 16. The analog still picture signal is supplied to the monitor receiver 17 as the third display signal and is thereby displayed on the screen of the monitor receiver 17 with high resolution.

Though not shown, the input still picture signals representing the characters "C" and "D" are repeatedly processed in a series of the above-mentioned processing so that the first and second extracted still picture signals are written in and are read out from different ¼ field memory areas of the first and second main field memories 6 and 7 and the auxiliary field memory 8.

When the input still picture signal (field video signal) of the character "A" is stored in the main field memory 6 as, for example, shown in FIG. 4-I, the picture element signals forming the above still picture signal are numbered on the following table 1 in order to understand the present invention more clearly.

TABLE 1

| 1 | 2 | 3 | 4 | 5 | 6 | 7 | 8 | 9 | 10 | 11 | 12 |
|---|---|---|---|---|---|---|---|---|----|----|----|
| 13 | 14 | 15 | 16 | 17 | 18 | 19 | 20 | 21 | 22 | 23 | 24 |
| 25 | 26 | 27 | 28 | 29 | 30 | 31 | 32 | 33 | 34 | 35 | 36 |
| 37 | 38 | 39 | 40 | 41 | 42 | 43 | 44 | 45 | 46 | 47 | 48 |
| 49 | 50 | 51 | 52 | 53 | 54 | 55 | 56 | 57 | 58 | 59 | 60 |
| 61 | 62 | 63 | 64 | 65 | 66 | 67 | 68 | 69 | 70 | 71 | 72 |
| 73 | 74 | 75 | 76 | 77 | 78 | 79 | 80 | 81 | 82 | 83 | 84 |
| . | . | . | . | . | . | . | . | . | . | . | . |
| . | . | . | . | . | . | . | . | . | . | . | . |

If n=1 in this case, the first extracted still picture signal is formed of picture element signals 1, 3, 5, ..., 11 on the first row, picture element signals 25, 27, 29, ..., 35 on the third row, picture element signals 49, 51, 53, ..., 59 on the fifth row ...; and the second extracted still picture signal is formed of picture element signals 14, 16, 18, ..., 24 on the second row, picture element signals 38, 40, 42, ... 48 on the fourth row, picture element signals 62, 64, 66, ..., 72 on the sixth row ...

If n=2, the first extracted still picture signal is formed of picture element signals 1, 4, 7 and 10 on the first row, picture element signals 37, 40, 43 and 46 on the fourth row, the picture element signals 73, 76, 79 and 82 on the seventh row ...; and the second extracted still picture signal is formed of mean picture element signals of the picture element signals 14, 15, 26 and 27 on the second and third rows, mean picture element signals of the picture element signals 17, 18, 29 and 30 on the second and third rows, mean picture element signals of picture element signals 20, 21, 32 and 33 on the second and third rows, mean picture element signals of picture element signals 23, 24, 35 and 36, mean picture element signals of picture element signals 50, 51, 62 and 63 on the fifth and six rows, mean picture element signals of picture element signals 53, 54, 65 and 66 on the fifth and sixth rows, mean picture element signals of picture element signals 56, 57, 68 and 69 on the fifth and sixth rows, mean picture element signals of the picture element signals 59, 60, 71 and 72 on the fifth and sixth rows, ...

Furthermore, if n=3, the first extracted still picture signal is formed of picture element signals 1, 5 and 9 on the first row, picture element signals 49, 53 and 57 on the fifth row ..., while the second still picture element signal is formed of picture element signals 27, 31 and 35 on the third row, picture element signals 75, 79 and 83 on the seventh row ...

That is, if n is an odd number, no problem is presented. If n is an even number, the second picture element signal has to be provided by computing (digitally computing) the picture element signals, interpolated by averaging the picture element signals (levels of the picture element signal), by means of the computer 1.

When the edition or processing of the still picture signals is ended in such a manner that the first and second picture element signals representing the characters "A" to "D" are stored in the memories 7 and 6, the first and second still picture signals are supplied through the bus 5 to the communication interface and communication processing circuit 19, in which they are suitably encoded and modulated. The thus processed signal is transmitted to the transmission line 20, from which it is transmitted to other still picture communication terminals.

The first and second extracted still picture signals are mixed by the mixing circuit 14 in the corresponding terminal apparatus or a terminal apparatus to which the first and second still picture signals are transmitted. Then, the mixed still picture signal can be printed out on the video printer 18.

According to the present invention, as described above, it is possible to obtain a still picture signal editing or processing apparatus which is inexpensive and which can display a signal with high resolution by reading a plurality of still picture signals stored in the memories without increasing its cost.

Having described a preferred embodiment of the invention with reference to the accompanying drawings, it is to be understood that the invention is not limited to that precise embodiment, and that various changes and modifications thereof may be effected therein by one skilled in the art without departing from the scope or spirit of the invention as defined in the appended claims.

We claim as our invention:

1. A still picture signal processing apparatus for processing a still picture signal and for displaying a still picture according to a still picture signal comprising:
    (a) still picture signal source means for generating a still picture signal;
    (b) analog-to-digital converting means for converting said still picture signal into a digitized still picture signal;
    (c) first and second main field memory means;
    (d) auxiliary field memory means;
    (e) signal processing means for processing a still picture signal;
    (f) display means for displaying a still picture;
    (g) means for supplying a signal selectively read out from said first and second main field memory means to said display means; and
    (h) memory control means for controlling read and write operations of said first and second main field memory means and auxiliary field memory means, thereby a digitized still picture signal from said analog-to-digital converting means is supplied to said first main field memory means, said digitized still picture signal is read out from said first main field memory means, and is compressed by 1/n in data amount and is separated into first and second compressed signals by said signal processing means, said first and second compressed signals are supplied to said second main field memory means and auxiliary field memory means, respectively and written in portions of said second main field memory means and auxiliary field memory means, respectively, said second compressed signal is read out from said auxiliary field memory means and is supplied to said first main field memory means, and said first and second compressed signals are read out from said second and first main field memory means, combined and supplied to said display means.

2. A still picture signal processing apparatus according to claim 1, wherein said signal processing means compresses said digitized still picture signal in horizontal and vertical directions equally.

3. A still picture signal processing apparatus according to claim 2, wherein said signal processing means generates said first compressed signal by selecting every predetermined number of picture element data of said digitized still picture signal in both horizontal and vertical directions and generates said second compressed signal by selecting picture element data between said picture element data selected as said first compressed data.

4. A still picture signal processing apparatus according to claim 1, wherein first to nth digitized still picture signals are sequentially supplied to said first main field memory means.

5. A method of processing a still picture signal by a still picture signal processing apparatus having first and second main field memory means, auxiliary field memory means and display means, said method comprising the steps of:
(1) converting a first still picture signal to a digitized first still picture signal;
(2) supplying said digitized first still picture signal to said first main field memory means;
(3) reading out said stored digitized first still picture signal from said first main field memory means;
(4) compressing said read out digitized first still picture signal by 1/n in data amount and generating first and second compressed signals;
(5) supplying said first and second compressed signals to said second main field memory means and said auxiliary field memory means, respectively;
(6) reading out said second compressed signal from said auxiliary field memory means;
(7) supplying said read out second compressed signal to said first main field memory means;
(8) reading out said first and second compressed signals from said second and first main field memory means;
(9) combining said read out first and second compressed signals and supplying said combined signal to said display means; and
(10) repeating said steps (1) to (9) for second to nth still picture signals, respectively.

* * * * *